United States Patent [19]

Diederich

[11] Patent Number: 4,899,860
[45] Date of Patent: Feb. 13, 1990

[54] FAN CLUTCH MECHANISM

[76] Inventor: Paul W. Diederich, 633 Hunters Trail, Glendora, Calif. 91740

[21] Appl. No.: 219,828

[22] Filed: Jul. 14, 1988

Related U.S. Application Data

[63] Continuation of Ser. No. 9,120, Feb. 11, 1987, abandoned.

[51] Int. Cl.$^4$ .............................................. F16D 35/00
[52] U.S. Cl. .................. 192/58 B; 192/82 T; 192/107 R; 192/110 R; 192/110 B; 192/113 A; 403/337; 123/41.49
[58] Field of Search ................ 192/58 R, 58 A, 58 B, 192/58 C, 82 T, 56 F, 107 R, 110 R, 110 B, 110.5, 112, 113 A; 403/3, 4, 24, 337; 29/526 R; 123/41.46, 41.49, 41.65, 195 A

[56] References Cited

U.S. PATENT DOCUMENTS

| | | | |
|---|---|---|---|
| 3,002,595 | 10/1961 | Weir | 192/58 B |
| 3,390,748 | 7/1968 | Hein et al. | 192/58 B |
| 3,575,269 | 4/1971 | Sherman | 192/58 R |
| 3,741,359 | 6/1973 | Leichliter | 192/58 B |
| 3,824,807 | 7/1974 | Hecht | 123/41.46 |
| 3,964,582 | 6/1976 | Mitchell | 192/58 B |
| 4,066,048 | 1/1978 | Premus | 123/41.49 |
| 4,180,024 | 12/1979 | Hernandez | 123/41.46 |
| 4,257,501 | 3/1981 | Woods | 192/58 C |
| 4,432,444 | 2/1984 | Hauser | 192/82 T |
| 4,692,053 | 9/1987 | Sampeoro | 192/58 B |

Primary Examiner—Leslie A. Braun
Assistant Examiner—David A. Testardi
Attorney, Agent, or Firm—Boniard I. Brown

[57] ABSTRACT

An original, replacement, or aftermarket mechanism which responds to predetermined maximum torque levels to decouple a radiator fan from the rotation of a driving element, usually a water pump. The mechanism includes variable mounting adaptations which can accommodate water pumps and fans of different lengths, diameters and required physical location so that a large number of vehicular applications can be satisfied with a few different size fan clutch mechanisms. The mechanism includes a rotor case connected to the fan and a rotor connected to the water pump. The rotor is positioned in a cavity in the case and is immersed in nonlinear fluid such as silicon fluid. The rotor side surfaces as well as the adjacent side surfaces of the case include depressed grooves which are out of alignment with the normal motion of the fluid so that random motion of the fluid caused by the sweeping action of the grooves prevents hot spots from occurring within the mechanism when it is decoupling the fan by allowing relative rotation between the rotor and the rotor case.

31 Claims, 2 Drawing Sheets

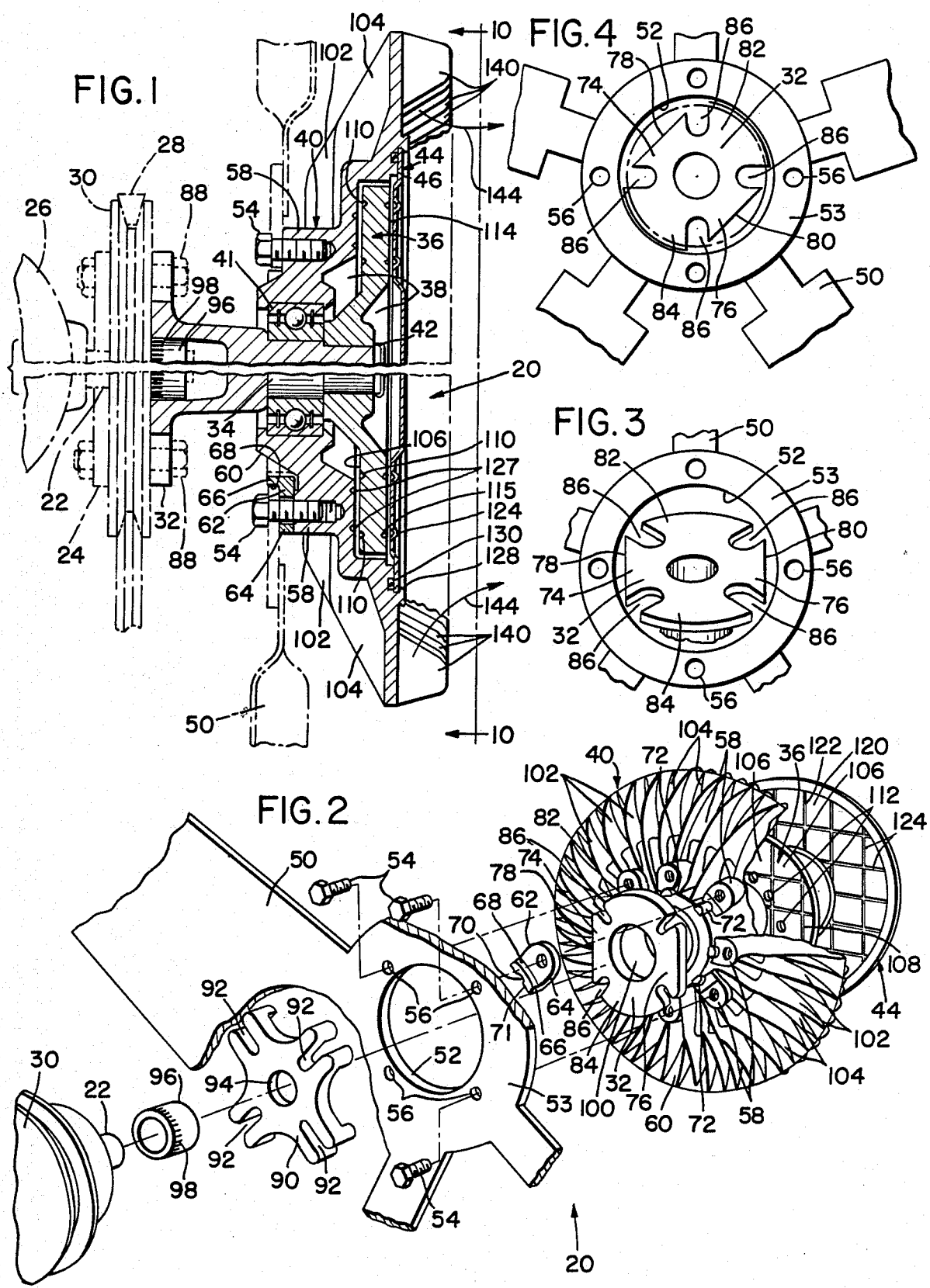

FAN CLUTCH MECHANISM

This is a continuation of co-pending application Ser. No. 07/009,120 filed on 2/11/87, now abandoned.

BACKGROUND OF THE PRESENT INVENTION

In the search for fuel economy in internal combustion powered vehicles, it has become common to provide some sort of clutch mechanism between the radiator fan and its prime mover. Some such mechanisms respond to temperature or rotational velocity, while others respond to high torque levels being transmitted to the fan to sense and act upon the need to reduce the coupling between the prime mover and the fan. These mechanisms allow a radiator fan to be bladed and pitched to provide sufficient cooling in stop-and-go traffic and yet pump no greater amounts of air through the radiator than is required at highway speeds.

One particular type of fan clutch mechanism includes a rotor mounted to rotate with respect to a surrounding case filled with a material such as silicon fluid which responds to shear forces in a nonlinear manner. The fluid causes lock-up between the rotor and the surrounding case at low torque levels but at higher torque levels releases the rotor from the case so that the two can spin relative to each other. There is, of course, energy expended in this operation which heats the silicon fluid and the surrounding mechanism. Heretofore, rotors and rotor cases have had dead zones where the fluid tends to remain creating hot spots which overheat the fluid causing it to break down and ultimately cause a premature failure of the clutch mechanism.

The design of various vehicles requires different mounting arrangements, diameters and spacing of the radiator fan. These differences caused by automotive design normally require that a large number of different fan clutch mechanism be stocked to supply the market. This is disadvantageous to both original equipment and aftermarket suppliers.

Therefore there has been a need to provide an easily manufactured fan clutch mechanism of the nonlinear fluid type which eliminates hot spots, provides adequate cooling, and accommodates installations with different physical dimension requirements.

BRIEF DESCRIPTION OF THE PRESENT INVENTION

The present fan clutch mechanism includes a central shaft with mounting means on one end for connection to a water pump or prime mover, and a radially extending, disk shaped rotor connected at the other end. A rotor case is mounted about the shaft on bearing means so that it can rotate with respect to the rotor. When combined with a cover plate, the rotor case completely surrounds the rotor in a cavity which has surfaces parallel to the side surfaces of the rotor, with relatively small running clearances therebetween. A nonlinear fluid, such as silicon fluid, is sealed within the cavity to act as the torque transferring agent between the rotor and the rotor case.

The cover plate, the inner surface of the rotor case and the flat radial surfaces of the rotor include depressions in the form of a grid of grooves. The grooves cause a generally nonoriented sweep of the fluid to prevent the friction energy generated by shearing of the fluid during decoupling from creating hot spots on the rotor, the rotor case on the cover plate. Decoupling occurs when the rotational speed of the fan connected to the rotor case becomes high enough to generate a resisting torque sufficient to shear the fluid.

The rotor case includes a multiplicity of front and rear cooling fins to dissipate the generated heat. The front cooling fins face the radiator. They act to cool the case and draw air over the cover plate to cool it also. The rear fins in the form of large and small vanes, direct air over the rear of the rotor case. The small vanes alternate with the larger vanes. This gives the large vanes adequate spacing to bite the disturbed air behind the housing and to pump air both over themselves and the small vanes which serve primarily as cooling elements rather than air impellers.

The back of the rotor case includes a plurality of bosses positioned at different diameters and spacing to accommodate the attachment of various fans. In addition, small spacers can be provided to further adjust the positioning of the fan with respect to the housing while assuring that the fan is centered thereon.

Radiator fans normally have a hole through their hubs. The mounting means on the shaft are specially shaped having two opposite full diameter quadrants and two opposite shortened quadrants positioned between four mounting slots so that fans with smaller center holes than the full diameter of the mounting means can be moved therebehind. A rear spacer and reducer bushing to accommodate water pump shafts of different lengths and diameters may also be included.

It is therefore an object of the present invention to provide a fan clutch mechanism which has a forceful lock up yet can accommodate relative rotation between a fan and a water pump at high velocities for a long period of time without overheating.

Another object of the present invention is to eliminate hot spots in fan clutch mechanisms utilizing nonlinear fluid as their torque transmitting agent.

Another object is to provide a fan clutch mechanisms which can be used on various engines and vehicle types through the use of adjustable mounting means.

Another object is to provide a fan clutch mechanism which is relatively easily manufactured and which can withstand the rigors associated with its intended environment for long periods of time without maintenance or replacement.

These and other objects and advantages of the present invention will become apparent to those skilled in the art after considering the following detailed specification together with the accompanying drawings wherein:

BRIEF DESCRIPTION OF THE DRAWINGS

FIG. 1 is a side cross-sectional view of a fan clutch mechanism constructed according to the present invention attached to water pump;

FIG. 2 is an exploded view of a fan clutch mechanism, like that shown in FIG. 1, showing various adjustment features;

FIG. 3 illustrates how a fan with a small diameter hub hole can be moved behind the mounting flange of the mechanism;

FIG. 4 is a diagrammatic view showing the fan of FIG. 3 once it has been connected behind the mounting flange of the mechanism;

DETAILED DESCRIPTION OF THE SHOWN EMBODIMENT

Figure 5:
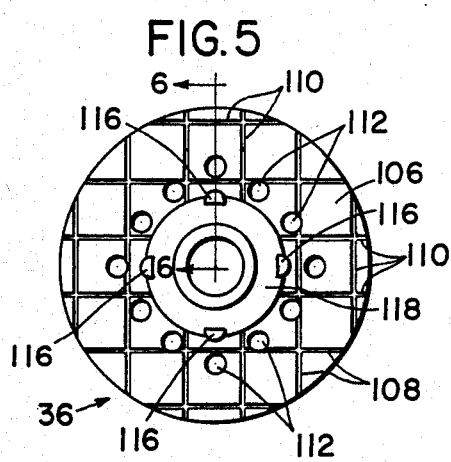
FIG. 5 is a rear elevational view of the rotor of FIG. 1.

Referring to the drawings more particularly by reference number, number 20 refers to a fan clutch mechanism constructed according to the present invention attached to the shaft 22 and mounting plate 24 of a water pump 26. The water pump 26 and the fan clutch mechanism 20 are normally driven by a fan belt 28 through the pulley 30 shown positioned between the mounting plate 24 of the water pump 26 and the mounting flange 32 of the mechanism 20.

The mounting flange 32 is connected by means of a shaft 34 to a rotor 36 positioned in a cavity 38 in a rotor housing 40. The shaft 34 with its connected rotor 36 and mounting flange 32 is mounted for rotation within the rotor housing 40 by means of a fluid tight ball bearing 41. When the mechanism 20 is being assembled, the rotor 36 is permanently mounted on the shaft 34 by deforming the end 42 thereof. Thereafter, the cavity 38 is closed by the attaching a cover plate 44 over the outer face 46 of the rotor housing 40 to form the enclosed cavity 38 which is filled by the rotor 36 and nonlinear fluid, such as silicon fluid 48. In clutch mechanisms of types which respond to temperature, an outer cover plate (not shown), which may carry a bi-metallic temperature-responsive device, is mounted exteriorly of plate 44 which is then an interior plate.

The fluid 48 acts as a torque transfer agent between the rotor, and the rotor housing and cover plate. At low levels of torque, the rotor housing 40 rotates at generally the same rotational velocity as the rotor 36, but that at high torque, such as occurs when an attached fan 50 is rotated at high rotational velocities, the silicon fluid 48 shears and allows relative rotation between the rotor 36 and the rotor housing 40.

As shown in FIG. 2, the rotor housing 40 is designed to accommodate different fans 50 and different water pumps 26. Fans 50 normally include a center hole 52 at their hub 53 which may be of different diameter from fan to fan. Fans 50 normally are attached to the rotor housing 40 by means of bolts 54 which pass through a plurality of bolt holes 56 in the hub 53 about the center hole 52. However, the number of bolts 54 and the pattern for the holes 56 through the fan 50 can vary greatly from vehicle to vehicle. Therefore, a plurality of mounting bosses 58 are provided on the rear 60 of the rotor housing 40. The bosses 58 shown in FIG. 2 are typical of those that could provide mounting for fan holes spaced on 2⅜ and 2⅝ inch diameters.

Since as aforesaid, the center holes 52 of different fans 50 may have different diameters, spacer adapters 62 can be provided to both center the fan 50 and assure its proper radial positioning with respect to the water pump 26. The spacer adapter 62, shown in FIG. 2, includes a longitudinal spacer portion 64 whose thickness longitudinally positions the fan 50 with respect to the water pump 26. Its inner shoulder 66 has a curved outer edge 68 to engage the center hole 52 of the fan 50 so that a plurality of the spacer adapters 62 can assure proper centering thereof. A notch 70 is provided in the inner cylindrical surface 71 of the spacer adapter 62 for mating with ribs 72 formed adjacent the mounting bosses 58 on the rotor housing 40. The notches 70 and ribs 72 assure proper radial positioning of the spacer adapters 62 when installed on the rotor housing mounting bosses 58.

In some instances the center hole 52 is smaller than the desired outer diameter of the mounting flange 32. If the mounting flange 32 had a cylindrical outer edge, a fan 50 with a small center hole 52 could not be positioned thereover. Therefore, the mounting flange 32 includes two opposite quadrants 74 and 76 having shaved outer edges 78 and 80. The quadrants 74 and 76 as well as the full diameter quadrants 82 and 84 are formed between mounting slots 86 which extend radially outwardly to allow for installation of mounting bolts 88 for connection to the mounting plate 24 at different diameters. As shown in FIG. 3, when it is desired to install a fan 50 with a small center hole 52 over the mounting flange 32, the fan 50 is tilted so that its center hole 52 can slide over the quadrants 74 and 76 until it can be positioned therebehind as shown in FIG. 4.

When it is desired to position the fan clutch mechanism 20 with its attached fan 50 further away from the water pump 26, a spacer such as the cruciform spacer 90 with mounting slots 92 like those of the mounting flange 32 can be used. The spacer 90 also includes a center hole 94 through which the shaft 22 of the water pump 26 is extended. Spacer members, such as spacer member 90, are relatively economical to manufacture and therefore an assortment can be economically provided with a fan clutch mechanism kit to adapt the mechanism 20 to various installations. Reducer bushings, such as reducer bushing 96 can also be included for those installations where a small outer diameter shaft 22 is present on a water pump 26 for use with a fan clutch mechanism 20 which can also be used on water pumps having drive shafts 22 of larger diameters. The reducer bushing 96 includes a knurled portion 98 adjacent its rear so that once the bushing 96 is pressed in the mounting flange 32, it tends to remain there. If a spacer member 90 is required in a particular installation, bushing 96 is pressed into the opening in the spacer member. The spacer 90 can be positioned or guided in relation to the axis of shaft 22, bushing 96 or the opening 100 in flange 32.

It should be noted that the rear 60 of the rotor housing 40 includes a plurality of alternating large and small vanes 102 and 104 respectively. Both act as cooling fins with the large vanes 102 being spaced by the small vanes so that they are more efficient in catching and pumping air therethrough in the disturbed atmosphere behind the radiator. Therefore, the large vanes pump air across themselves and across the small vanes whereas if all of the vanes 102 and 104 were of the same size, the tendency would be for the vanes to shear the surrounding flow rather than pumping it between them.

Figure 6:
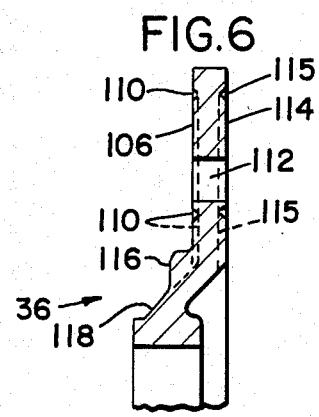
FIG. 6 is an enlarged, cross-sectional view of the rotor taken on line 6—6 of FIG. 5.

The rear surface 106 of the rotor 36 is shown in FIG. 5. The rotor surface 106 includes a grid 108 of depressed grooves 110. The grid 108 shown has a rectangular pattern which is generally nondirectional with respect to flow of the silicon fluid 48 within the rotor housing 40. The rotor 36 also includes a plurality of orifices 112 for allowing flow of fluid between the rear surface 106 and the front surface 114 thereof (FIG. 6). The grooves 115 on the front surface 114 are on a grid similar to the grid 108 on the rear surface 106. Four upstanding knobs 116 are provided on a frustroconical inner surface 118 of the rotor 36 to assist in assuring movement of the fluid 48 throughout the cavity 38 of the rotor housing 40.

Figure 7:
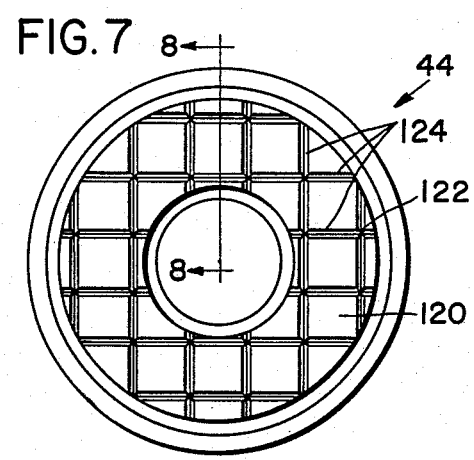
FIG. 7 is a rear or inner side elevational view of the cover plate of FIG. 1.
Figure 8:
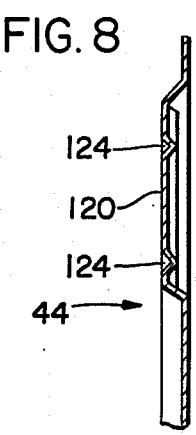
FIG. 8 is an enlarged, cross-sectional view of the cover plate of FIG. 7 taken on line 8—8 thereof.
Figure 9:
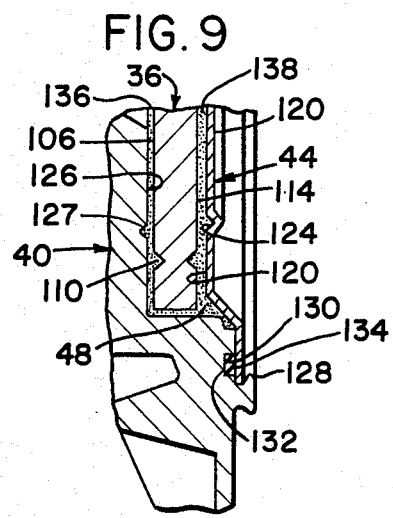
FIG. 9 is an enlarged, cross-sectional view of a portion of the rotor, rotor housing, and cover plate.

As shown in FIGS. 7, 8 and 9, the cover plate 44 includes in its inner radial surface 120, a grid 122 of depressed grooves 124 laid out in a rectangular pattern like grid 108. The outwardly facing radial surface 126 of the rotor housing 40 also includes a pattern of depressed grooves 127. When assembled, the cavity 38 is filled with silicon fluid 48 and then the cover plate 44 is permanently attached to the rotor housing 40 by peening over a cylindrical outer edge 128 thereon. Leakage of the fluid 48 is prevented by providing a O-ring 130 in a concentric circular groove 132 in the housing 40 to form a radial face seal 134 with the cover plate 44.

When the fan clutch mechanism 20 is in operation, the grooves 110, 115, 124 and 127 sweep relatively thick channels of fluid over the opposite adjacent surfaces to prevent hot spots from forming. This allows the clearances 136 and 138 between the outer surface 126 of the rotor housing 40 and the outer surface 126 of the rotor housing 40 and the rear surface 106 of the rotor 36 and the front surface 114 of the rotor 36 and the inner surface 120 of the cover plate 44 to be held very close to provide maximum rotor lock up and better utilization of the surface area. This in turn provides improved cooling and a proper power curve for modern cars whose engines run at low speeds for better gas economy yet are capable of high rpm for quick bursts of acceleration.

Figure 10:
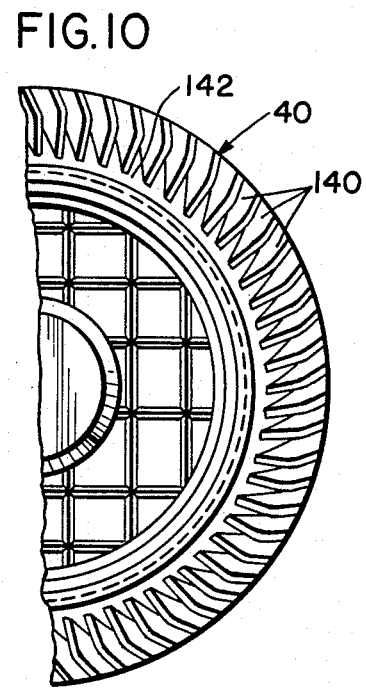
FIG. 10 is partial front elevational view of the mechanism taken on line 10—10 in FIG. 1.

As can be seen in FIG. 10, a plurality of forward vanes 140 are provided on the front 142 of the rotor housing 40. These cause air to move as shown by the arrows 144 in FIG. 1, to flow over and cool the cover plate 44 and also cool the housing 40 directly off of the vanes 140.

Thus there has been shown and described a novel fan clutch mechanism which fulfills all of the objects and advantages sought therefor. Many changes, modifications, variations, uses and applications of the subject invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A fan clutch mechanism for decoupling the rotation of a fan from a driving element including:
   a shaft adapted for connection to the driving element having:
      a rotor connected thereto, said rotor including:
         a first radial substantially flat surface having:
            a first plurality of depressed rectilinear grooves having distinct widths defined therein, said grooves including a first set of grooves and a second set of grooves, the two sets of grooves intersecting to define a grid pattern, said grooves of each set being widely spaced from each other by distance equal to at least a plurality of said groove widths to define substantial flat unridged surface areas therebetween; and
   a housing having:
      bearing means therein for allowing relative rotation of said housing with respect to said shaft and rotor;
      fan mounting means thereon;
      a first housing surface positioned parallel to and closely spaced to said first radial surface of said rotor, said first housing surface in part with said housing defining a cavity about said rotor, said first housing surface having:
         a second plurality of depressed rectilinear grooves defined therein, said grooves being widely spaced apart to define substantial flat surface areas therebetween;
      nonlinear fluid in said cavity with said rotor, whereby said nonlinear fluid between said first radial surface and said first housing surface shears when subjected to predetermined torque levels to rotationally decouple said rotor from said housing, and
      said flat surface areas defined by the grooves of the first plurality and the flat surface areas defined by the second plurality of depressed grooves being sized and configurated to act on said fluid to impart a sweeping action to the fluid to effect a random non-directional fluid movement to prevent development of hot spots within the mechanism.

2. The fan clutch mechanism as defined in claim 1 wherein said first and second pluralities of depressed grooves are patterned in rectangular grids.

3. The fan clutch mechanism as defined in claim 1 wherein said rotor further includes:
   a second radial surface having:
      a third plurality of depressed grooves therein, and wherein said housing includes:
   a second housing surface positioned parallel to and closely spaced to said second radial surface of said rotor, said second housing surface in part defining said cavity about said rotor and having:
      a fourth plurality of depressed grooves therein, whereby said nonlinear fluid between said second radial surface and said second housing surface shears when subjected to predetermined torque levels to decouple said rotor from said housing.

4. The fan clutch mechanism as defined in claim 3 wherein said first, second, third, and fourth pluralities of depressed grooves are patterned in rectangular grids.

5. The fan clutch mechanism as defined in claim 3 wherein said housing further includes:
   a cover plate which includes said second housing surface;
   retention means for said cover plate; and
   a seal adjacent said retention means to retain said nonlinear fluid.

6. The fan clutch mechanism as defined in claim 5 wherein said bearing means are fluid tight bearing means.

7. The fan clutch mechanism as defined in claim 3 wherein said rotor includes:
   a plurality of passageways between said first and second radial surfaces thereof to allow flow of said nonlinear fluid therebetween.

8. The fan clutch mechanism as defined in claim 7 wherein said rotor includes:
   a plurality of impeller knobs adjacent said first radial surface thereof to pump said nonlinear fluid thereabout within said cavity.

9. The fan clutch mechanism as defined in claim 8 wherein said monlinear fluid is silicon fluid.

10. A fan clutch mechanism for decoupling the rotation of a fan from a driving element including:
a shaft adapted for connection to the driving element having:
a rotor connected thereto, said rotor including:
a first radial surface having:
a first plurality of depressed grooves therein; and
a mounting flange, said mounting flange including:
four radially extending bolt slots defining first, second, third, and fourth quadrants therebetween, said first and third quadrants being opposite each other and being shaped to have a predetermined outer diameter and said second and fourth quadrants being opposite each other and being shaped to have an outer surface with a maximum outer dimension less than said predetermined outer diameter of said first and third quadrants; and
a housing having:
bearing means therein for allowing relative rotation of said housing with respect to said shaft and rotor;
fan mounting means thereon;
a first housing surface positioned parallel to and closely spaced to said first radial surface of said rotor, said first housing surface in part with said housing defining a cavity about said rotor, said first housing surface having:
a second plurality of depressed grooves therein; and
nonlinear fluid in said cavity with said rotor, whereby said nonlinear fluid between said first radial surface and said first housing surface shears when subjected to predetermined torque levels to rotationally decouple said rotor from said housing.

11. The fan clutch mechanism as defined in claim 10 wherein said outer surface of said second and fourth quadrants is planar.

12. The fan clutch mechanism as defined in claim 10, wherein the housing has a back surface, and further including:
a plurality of fan mounting bosses, at least some of which being positioned at different diameters from others.

13. A fan clutch mechanism for decoupling the rotation of a fan from a driving element including:
a shaft adapted for connection to the driving element having:
a rotor connected thereto, said rotor including:
a first radial surface having:
a first plurality of depressed grooves therein, and
a housing having:
bearing means therein for allowing relative rotation of said housing with respect to said shaft and rotor;
fan mounting means thereon;
a first housing surface positioned parallel to and closely spaced to said first radial surface of said rotor, said first housing surface in part with said housing defining a cavity about said rotor, said first housing surface having:
a second plurality of depressed grooves therein;
a housing back surface including:
a plurality of tall vanes disposed radially of said shaft and extending away from said first housing surface, and
a plurality of short vanes radial to the shaft and extending away from said first housing surface, one of said short vanes being disposed between each adjacent pair of said tall vanes,
the fan mounting means including a plurality of fan mounting bosses, at least some of which are positioned at different diameters from others,
nonlinear fluid in said cavity with said rotor, whereby said nonlinear fluid between said first radial surface and said first housing surface shears when subjected to predetermined torque levels to rotationally decouple said rotor from said housing, and
said grooves of the first plurality and second plurality of depressed grooves being sized and configurated to impart a sweeping action to the fluid to effect a random non-directional fluid movement to prevent development of hot spots within the mechanism.

14. A fan clutch mechanism for decoupling the rotation of a fan from a driving element including:
a shaft adapted for connection to the driving element having:
a rotor connected thereto, said rotor including:
a first radial surface having:
a first plurality of depressed grooves therein, and
a housing having:
bearing means therein for allowing relative rotation of said housing with respect to said shaft and rotor;
fan mounting means thereon;
a first housing surface positioned parallel to and closely spaced to said first radial surface of said rotor, said first housing surface in part with said housing defining a cavity about said rotor, said first housing surface having:
a second plurality of depressed grooves therein;
a back surface further including a plurality of fan mounting bosses, at least some of which are positioned at different diameters from others,
nonlinear fluid in said cavity with said rotor, whereby said nonlinear fluid between said first radial surface and said first housing surface shears when subjected to predetermined torque levels to rotationally decouple said rotor from said housing, and
said grooves of the first plurality and second plurality of depressed grooves being sized and configurated to impart a sweeping action to the fluid to effect a random non-directional fluid movement to prevent development of hot spots within the mechanism.

15. A fan clutch mechanism for decoupling the rotation of a fan from a driving element including:
a shaft adapted for connection to the driving element having:
a rotor connected thereto, and
a housing having:
bearing means therein for allowing relative rotation with respect to said shaft,
fan mounting means thereon,
a first housing surface positioned parallel to and closely spaced to said rotor, said first housing surface in part with said housing defining a cavity about said rotor,
nonlinear fluid in said cavity with said rotor, whereby said nonlinear fluid between said rotor and said first housing surface shears when subjected to predetermined torque levels to decouple said rotor from said housing, and
a back surface including:
a plurality of tall vanes disposed radially of said shaft and extending away from said first housing surface,
a plurality of short vanes radial to the shaft and extending away from said first housing surface, one of said short vanes being disposed between each adjacent pair of tall vanes,
a plurality of fan mounting bosses, at least some of which are positioned at different diameters from others, and
a plurality of spacer members shaped to fit on at least some of said bosses to vary the height of said bosses.

16. A fan clutch mechanism for decoupling the rotation of a fan from a driving element including:
a shaft having:
a rotor connected thereto; and
a mounting flange connected thereto, said mounting flange including:
four radially extending bolt slots defining first, second, third, and fourth quadrants therebetween, said first and third quadrants being opposite each other and being shaped to have a predetermined outer diameter and said second and fourth quadrants being opposite each other and being shaped to havie an outer surface with a maximum outer dimension less than said predetermined outer diameter of said first and third quadrants; and
a housing having:
bearing means therein for allowing relative rotation with respect to said shaft;
fan mounting means thereon;
a first housing surface positioned parallel to and closely spaced to said rotor, said first housing surface in part with said housing defining a cavity about said rotor; and
nonlinear fluid in said cavity with said rotor, whereby said nonlinear fluid between said rotor and said first housing surface shears when subjected to predetermined torque levels to rotationally decouple said rotor from said housing.

17. The fan clutch mechanism as defined in claim 16 wherein said outer surface of said second and fourth quadrants is planar, said mounting flange further including:
a bushing pressed therein, said bushing having:
a rear; and
a cylindrical knurled portion adjacent said rear.

18. The fan clutch mechanism as defined in claim 16 wherein said outer surface of said second and fourth quadrants is planar, and further including:
a cruciform spacer behind the mounting flange, and
a bushing pressed into an axial opening of the spacer.

19. The fan clutch mechanism as defined in claim 16, said housing further having:
a back surface including:
a plurality of large vanes extending away from said first housing surface; and
a plurality of small vanes extending away from said first housing surface positioned between said large vanes.

20. The fan clutch mechanism as defined in claim 19, said housing back surface further including:
a plurality of fan mounting bosses, at least some of which being positioned at different diameters from others.

21. A fan clutch mechanism for decoupling the rotation of a fan from a driving element including:
a shaft adapted for connection to the driving element having:
a rotor connected thereto, and
a housing having:
bearing means therein for allowing relative rotation with respect to said shaft,
fan mounting means thereon,
a first housing surface positioned parallel to and closely spaced to said rotor, said first housing surface in part with said housing defining a cavity about said rotor,
nonlinear fluid in said cavity with said rotor, whereby said nonlinear fluid between said rotor and said first housing surface shears when subjected to predetermined torque levels to decouple said rotor from said housing, and
a back surface including:
a plurality of tall vanes disposed radially of said shaft and extending away from said first housing surface, and
a plurality of short vanes extending away from said first housing surface, one of said short vanes being disposed between each adjacent pair of tall vanes, and the short vanes being radially substantially coextensive with the tall vanes.

22. A fan clutch mechanism for decoupling the rotation of a fan from a driving element including:
a shaft adapted for connection to the driving element having:
a rotor connected thereto, said rotor including:
a first radial surface having:
a first plurality of depressed grooves therein; and
a housing having:
bearing means therein for allowing relative rotation of said housing with respect to said shaft and rotor;
fan mounting means thereon,
a first housing surface positioned parallel to and closely spaced to said first radial surface of said rotor, said first housing surface in part with said housing defining a cavity about said rotor, said first housing surface having:
a second plurality of depressed grooves therein,
a housing back surface including:
a plurality of tall vanes disposed radially of said shaft and extending away from said first housing surface, and
a plurality of short vanes radial to the shaft and extending away from said first housing surface, one of said short vanes being disposed between each adjacent pair of said tall vanes, the short vanes being radially substantially coextensive with the tall vanes,
nonlinear fluid in said cavity with said rotor, whereby said nonlinear fluid between said first radial surface and said first housing surface shears when subjected to predetermined torque levels to rotationally decouple said rotor from said housing, and
said grooves of the first plurality and second plurality of depressed grooves being sized and configurated to impart a sweeping action to the fluid to effect a random non-directional fluid movement to prevent development of hot spots within the mechanism.

23. A fan clutch mechanism for decoupling the rotation of a fan from a driving element including:
a shaft adapted for connection to the driving element having:
a rotor connected thereto,
a housing having:
bearing means therein for allowing relative rotation with respect to said shaft,
a first housing surface positioned parallel to and closely spaced to said rotor, said first housing surface in part with said housing defining a cavity about said rotor,
viscous fluid in said cavity with said rotor, whereby said viscous fluid between said rotor and said first housing surface shears when subjected to predetermined torque levels to decouple said rotor from said housing, and
a back surface including:
a plurality of fan mounting bosses, at least some of which are positioned at different diameters from others for receiving fans of different sizes.

24. A fan clutch mechanism according to claim 23, wherein:
the rotor has a first radial surface having a first plurality of depressed grooves therein, and
the first housing surface has a second plurality of depressed grooves therein.

25. A fan clutch mechanism according to claim 24, and further including:
a plurality of fan mounting bosses on the housing are disposed at a first distance radially of the shaft to mount a fan of a first size, and wherein
said plurality of fan mounting bosses on the back surface of the housing are disposed at a second distance radially of the shaft to mount a fan of a second size.

26. A fan clutch mechanism according to claim 24, wherein:
said plurality of fan mounting bosses on said rotor housing are angularly displaced about said shaft from said plurality of fan mounting bosses on the housing back surface, and wherein said plurality of fan mounting bosses on the rotor housing are spaced farther from said shaft than said plurality of fan mounting bosses on the housing back surface.

27. A fan clutch mechanism according to claim 24, and further including:
spacer means adapted for mounting on the rotor housing and about the shaft, the spacer means being adapted to engage a center hole of a fan to be mounted on fan mounting means for proper centering thereof.

28. A fan clutch mechanism according to claim 23, and further including:
a plurality of fan mounting bosses on the housing are disposed at a first distance radially of the shaft to mount a fan of a first size, and wherein
said plurality of fan mounting bosses on the back surface of the housing are disposed at a second distance radially of the shaft to mount a fan of a second size.

29. A fan clutch mechanism according to claim 23, wherein:
said plurality of fan mounting bosses on said rotor housing are equally spaced about said shaft.

30. A fan clutch mechanism according to claim 23, wherein:
said plurality of fan mounting bosses on said rotor housing are angularly displaced about said shaft from said plurality of fan mounting bosses on the housing back surface, and wherein said plurality of fan mounting bosses on the rotor housing are spaced farther from said shaft than said plurality of fan mounting bosses on the housing back surface.

31. A fan clutch mechanism according to claim 23, and further including:
spacer means adapted for mounting on the rotor housing and about the shaft, the spacer means being adapted to engage a center hole of a fan to be mounted on fan mounting means for proper centering thereof.

* * * * *